Figure 1:
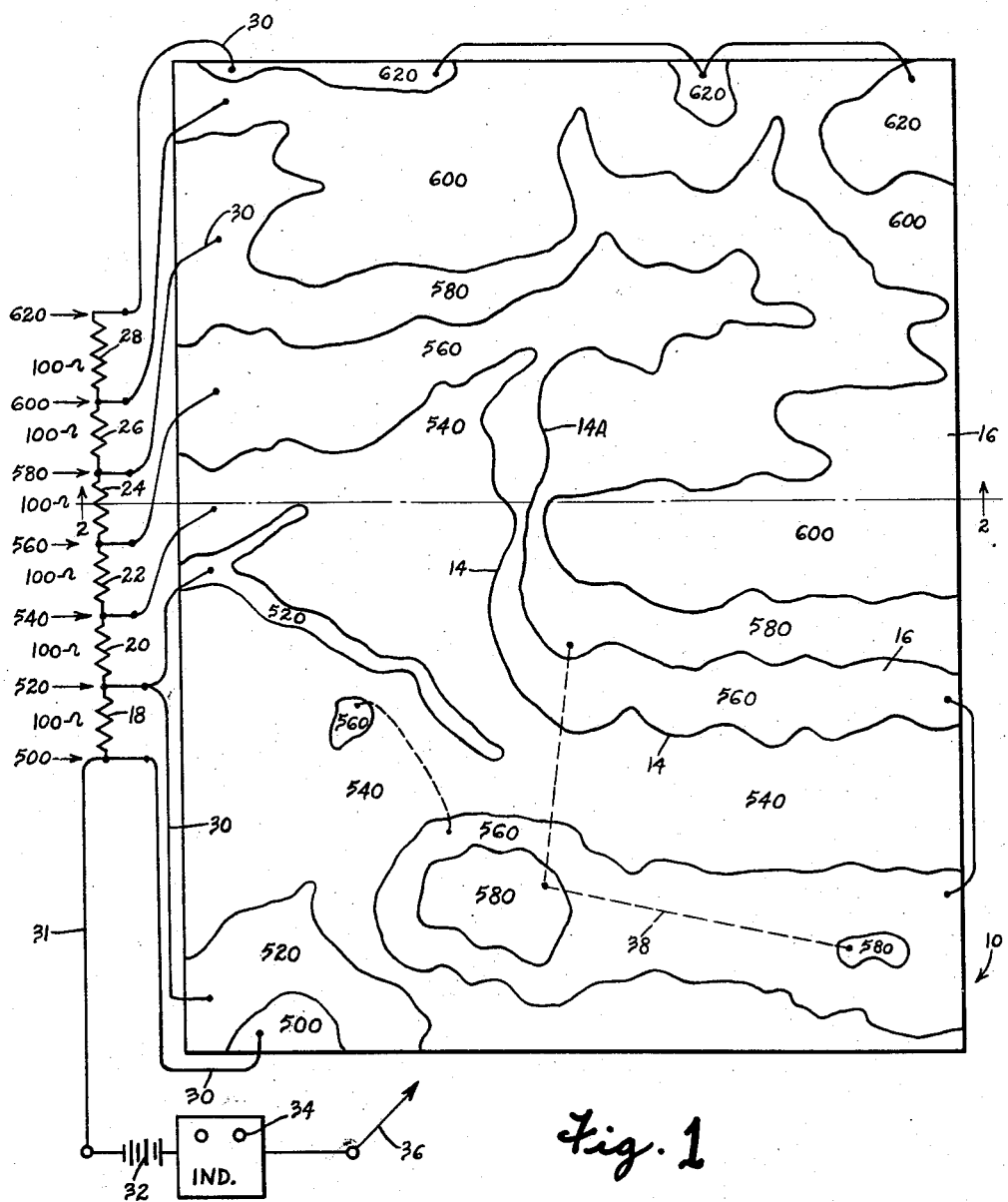

March 10, 1959 J. A. STIEBER 2,876,562
ELECTRICAL METHOD AND MEANS FOR MAKING RELIEF MAPS
Filed March 10, 1955 2 Sheets-Sheet 1

INVENTOR.
JOSEPH A. STIEBER
BY
ATTORNEYS

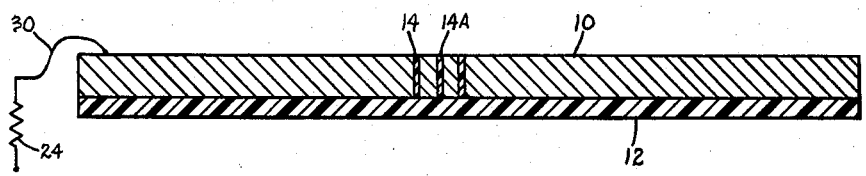
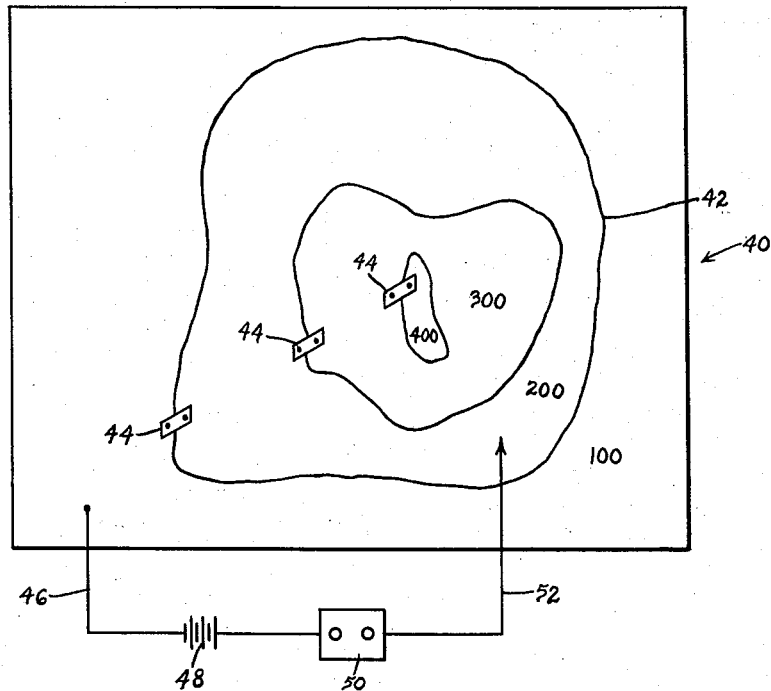

United States Patent Office 2,876,562
Patented Mar. 10, 1959

2,876,562

ELECTRICAL METHOD AND MEANS FOR MAKING RELIEF MAPS

Joseph A. Stieber, Valley Stream, N. Y.

Application March 10, 1955, Serial No. 493,585

7 Claims. (Cl. 35—41)

(Granted under Title 35, U. S. Code (1952), sec. 266)

The invention described herein may be manufactured and used by or for the Government of the United States of America for governmental purposes without the payment of any royalties thereon or therefor.

The invention relates to flat-surfaced topographic maps and a method and apparatus to automatically scan the map to convert the contour information on the map into a three-plane contour map structure.

There has long been a need to produce master contour maps which are capable of being electrically scanned to provide contour information that can be converted into three dimensional terrain models. Attempts have been made to electrically obtain information via contour lines. However, this has not been successful, for direct means to obtain the actual distances between each elevation are not available by this method. The instant device solves this problem in a simple and direct manner, now making it possible to obtain information not only relating to contour changes, but also accurately reproducing the distances between each rise or fall in elevation.

A primary object of the invention is to automatically convert a plan image of a terrain map into a three dimensional elevation of said map. This involves taking the information regarding changes in elevation and depicting those changes in a terrain model which now includes height as well as width and length.

An important object of the invention resides in the provision of a simple method to electrically scan a map and convey that information to a computer for conversion into a master model of the terrain.

Still another object of the invention is to avoid the necessity for skilled technicians to convert contour information into three dimensional information.

A feature of the invention resides in the use of a copper plate having the contour lines etched in it to provide the necessary information for constructing the three dimensional terrain model.

Another feature resides in the use of resistance units across insulated contour lines to provide the information used by the computer to define the normal rise or depression of the terrain.

And yet another feature resides in the contact by a scanning means of separate, energizable plates, each elevation being indicated by a resistance value individual thereto.

Other objects and many of the attendant advantages of this invention will be readily appreciated as the same becomes better understood by reference to the following detailed description when considered in connection with the accompanying drawings wherein:

Fig. 1 is a plan view of the conductive plate with the contour lines etched therein, Fig. 2 is a section taken on line 2—2 of Fig. 1, illustrating the plate construction, and Fig. 3 is a plan view of a modified form of the invention.

The basic inventive concept takes advantage of the fact that each level of elevation is conductive and is separated by insulated contour lines. After obtaining a reading for each elevation by means of electrical differentiation, the information is conveyed by means of a computer (not shown) to a three dimensional terrain model. One form of the invention is illustrated in Figs. 1 and 2.

The device consists of a thin copper sheet or plate 10 secured to an insulated base 12 of any desired material. Base 12 and sheet 10 are bonded together by means of heat treatment, cementing, or some similar method. A map of the terrain is etched into plate 10. The etching process is carried out by adding a photographic enamel emulsion to a blank copper sheet. The positive is placed in contact with the copper plate, which is then exposed. The print is developed and washed which clears off the emulsion where lines exist to expose the copper. This leaves the enamel emulsion on the copper surface, between the lines.

The etching solution to etch the contour lines 14 is then added and is washed off to leave the lines etched through the copper.

Contour lines 14 are therefore lines of insulation between the conductive copper plate to thereby isolate each successive elevation into an island 16, separated from the next adjacent elevation. In any contour map, the configuration of a surface is shown by means of contour lines, representing predetermined, regular intervals of elevation. These intervals of elevation, or contour intervals may be selected, for example, with each interval being equal to every twenty feet of elevation, or at any desired scale. The contour lines connect the points on the land surface that have the same elevation. Therefore, each continuous line represents a specific elevation change and each island 16 represents a particular elevation whose boundaries extend within contour lines 14. For example, contour line 14A represents a change in elevation of the terrain between 560 and 580 feet.

In carrying out the invention, adjacent contour areas are electrically connected to a resistance unit across the insulated lines. Resistors 18, 20, 22, 24, 26 and 28 are connected in series, each resistor having a resistance of 100 ohms. Each resistor is connected by electrical leads 30 to the corresponding contour level. The resistors are in series and connect from lead 31 to a battery, or similar source of power 32, the voltage levels being indicated on any suitable mechanism 34, which is directly connected to the scanner contact 36.

The operation of the device is now readily discerned. Scanner contact 36 automatically travels across copper plate 10 by means well-known in the art. The connected contour levels 16 have voltage levels corresponding to the resistance circuits which agree with the contour levels of the map. To illustrate, if scanner 36 were traveling along the section line of Fig. 1, a voltage reading corresponding to the 540 foot contour level on indicator 34 would be obtained, due to the connection of lead 30 with resister 20. This reading would remain on the indicator until the contour line 14 were crossed, after which a reading at the 560 foot level would be indicated at 34. Lead 30 at this level connects with resister 22. The reading at the 560 foot level continues until the next contour line is crossed, after which the voltage reading would become higher or lower, depending upon whether the terrain was rising or falling. It is obvious that a maximum reading is obtained at the 500 foot elevation, since maximum voltage is induced at this level by scanner contact 36. For convenience, some of the lead connections may be made at the underside of plate 10, as is illustrated at 38 in Fig. 1.

A computer (not shown) interpolates the information obtained to provide the information necessary to directly convert the map terrain information into three dimensional terrain models.

It is apparent that it now has become possible to electrically scan a contour map to provide contour information to a device which will automatically reproduce this information into three dimensional terrain models. Not only are the changes in terrain levels determined, but the actual distances between each change in elevation is also directly obtained to permit direct conversion into three dimensional models.

The invention is capable of being carried out in many ways. The informatiton needed is also obtained by impressing resistors across the contour lines directly on the copper plate map. This method is illustrated in Fig. 3, where map plate 40 has etched therein contour lines 42. Resistors 44 are painted across contour lines 42. Electrical lead 46 is secured to plate 40 and leads to a power source 48, which latter is in turn connected to indicator 50 and scanner member 52, in a manner similar to the illustration in Fig. 1.

When scanning means 52 touches the copper plate at the 100 foot contour level, the circuit is completed, but crosses no resistor 44 and therefore maximum voltage is obtained. When scanner 52 crosses contour line 42 at the 200 foot level, the resistance 44 is then in series with the power source and a definite potential reading is indicated on 50. When the 300 foot contour line is crossed, another resistor is added in series to change the voltage reading obtained. This procedure is carried through during the entire scanning operation to indicate both the rise and fall and the area covered by each terrain level.

Obviously, other electrical systems may be substituted. The same results are obtained by adding frequencies to give different amplitudes, or by the use of capacitance levels, or by means of frequency differentials to provide information pertaining to the different levels. It becomes thus apparent that many methods may be used to carry out the inventive concept of directly converting contour information into a three dimensional model of the terrain, as a continuous process.

Obviously many modifications and variations of the present invention are possible in the light of the above teachings. It is therefore to be understood that within the scope of the appended claims the invention may be practiced otherwise than as specifically described.

What is claimed is:

1. The method of directly converting two dimensional map information into three dimensional terrain data comprising the steps of etching non-conductive contour lines into a conductive terrain map to provide separating insulation between the various terrain levels, connecting resistances across the various terrain levels, and closing the circuit at any selected point on the terrain levels to obtain voltage readings for the selected levels.

2. The method of converting information directly to a point of use comprising bonding a conductive sheet of material to an insulator base, etching a contour map on the conductive sheet, etching insulating lines on the conductive sheet at selected points whereby different contour levels are marked off, connecting resistances across the insulating lines to form a closed circuit and electrically scanning across the contour map to provide contour level readings from the voltages thus derived.

3. The method of converting two dimensional map information directly into a three dimensional terrain data, comprising the steps of bonding a conductive sheet of material to an insulator base, producing a contour map on said conductive sheet by etching insulating lines between each level of elevation, applying a voltage for each contour level and electrically scanning across the conductive sheet to provide the information necessary to construct a three dimensional terrain model.

4. A contour map comprising an insulator base, a current conductive plate secured to said base upon which a contour map is etched thereby producing islands of conductive plate separated by exposed portions of insulator base, and resistance means connecting each of said islands and having voltage potentials specific to each rise in elevation applied across them.

5. The combination of claim 4, wherein resistors are painted across said insulation lines, thereby connecting adjacent terrain elevations.

6. The structure of claim 4 including scanning means which can sense the potential gradient across the surface of the map to produce corresponding relief for relief maps.

7. A relief map produced by bonding a conductive sheet of material to an insulator base, producing a contour map on said conductive sheet by etching insulating lines between each level of elevation, applying a voltage for each contour level and electrically scanning across the conductive sheet to provide the information necessary to construct a three dimensional terrain model.

References Cited in the file of this patent

UNITED STATES PATENTS

| | | |
|---|---|---|
| 2,452,664 | Koenig | Nov. 2, 1948 |
| 2,542,478 | Clark | Feb. 20, 1951 |
| 2,598,267 | Kayan | May 27, 1952 |